United States Patent [19]
Oguchi et al.

[11] Patent Number: 5,234,772
[45] Date of Patent: Aug. 10, 1993

[54] DIELECTRIC MULTILAYER, FILTER, MANUFACTURING METHOD THEREFOR, AND OPTICAL ELEMENT INCORPORATING THE SAME

[75] Inventors: Taisuke Oguchi; Hiroaki Hanafusa, both of Mito; Juichi Noda, Machida; Noriyoshi Yamada, Tokyo; Shiro Nishi, Kodaira; Nobuo Tomita, Johoku, all of Japan

[73] Assignee: Nippon Telegraph and Telephone Corporation, Tokyo, Japan

[21] Appl. No.: 654,010

[22] Filed: Feb. 12, 1991

[30] Foreign Application Priority Data

Feb. 13, 1990 [JP] Japan ................................ 2-31766

[51] Int. Cl.$^5$ .............................................. B32B 27/06
[52] U.S. Cl. .................................. 428/473.5; 385/14; 385/15; 385/130
[58] Field of Search ................... 428/473.5; 350/96.12, 350/96.11, 96.15

[56] References Cited

U.S. PATENT DOCUMENTS

| | | | |
|---|---|---|---|
| 4,790,615 | 12/1988 | Seki et al. ............................. | 359/885 |
| 5,108,201 | 4/1992 | Matsuura et al. .................... | 385/123 |

FOREIGN PATENT DOCUMENTS

| | | |
|---|---|---|
| 0366307 | 5/1990 | European Pat. Off. . |
| 63-64003 | 3/1988 | Japan . |
| 2189621 | 10/1987 | United Kingdom . |

OTHER PUBLICATIONS

"Design and Evaluation of Automatic Optical Fiber Operation Support System," H. Takasugi et al., Proceedings of 39th International Wire and Cable Symposium, 1990, pp. 632–629.

"Research on thin film anticounterfeiting coatings at the National Research Council of Canada," J. A. Dobrowolski et al., Applied Optics, vol. 28, No. 14, Jul. 15, 1989, pp. 2703–2717.

Applied Optics, vol. 24, No. 4, Feb. 15, 1985, J. R. McNeil et al., "Properties of TiO2 and SiO2 thin films deposited using ion assisted deposition", pp. 486–489.

Journal of Light Wave Technology, vol. 7, No. 11, Nov. 1989, H. Yanagawa et al., "Filter-Embedded Design and Its Applications to Passive Components", pp. 1646–1653.

*Primary Examiner*—Paul J. Thibodeau
*Assistant Examiner*—D. S. Nakarani
*Attorney, Agent, or Firm*—Finnegan, Henderson, Farabow, Garrett & Dunner

[57] ABSTRACT

A dielectric multilayer filter applicable to optical communication systems is disclosed, as is a fabrication method therefor, and an optical element incorporating the same. The disclosed dielectric multilayer filter includes a fluorinated polyimide base layer with a dielectric multilayer formed thereover. According to the disclosed fabrication method, a fluorinated polyimide layer is formed by applying liquid fluorinated polyimide material over a smooth surface to a predetermined thickness followed by drying and hardening, after which a dielectric multilayer is formed over the fluorinated polyimide layer by an ion assist vapor deposition method, and then stripping the fluorinated polyimide layer away from the underlying smooth surface. The disclosed dielectric multilayer filter can be easily and economically produced at a suitably small thickness with no need for grinding, exhibits highly uniform physical and optical properties, and is exceedingly durable and resistant to curling and warping.

2 Claims, 19 Drawing Sheets

FIG. 15
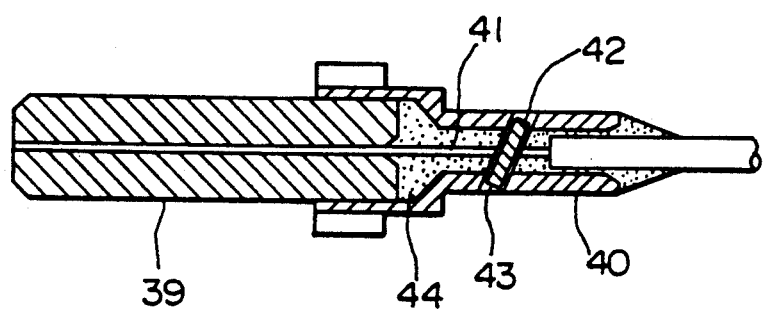
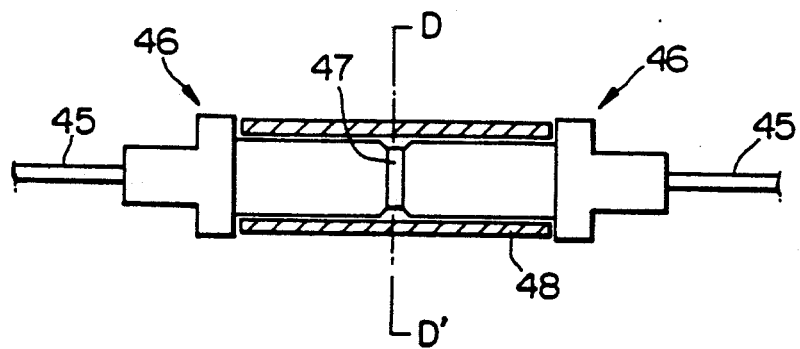
FIG. 16(a)
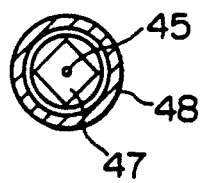
FIG. 16(b)

DIELECTRIC MULTILAYER, FILTER, MANUFACTURING METHOD THEREFOR, AND OPTICAL ELEMENT INCORPORATING THE SAME

BACKGROUND OF THE INVENTION

1. Field of the Invention

The present invention pertains to filters employed in optical communication systems, and more particularly, to dielectric multilayer interference filters for optical communication systems and to components which incorporate such filters.

2. Prior Art

In optical communication systems, optical elements which incorporate a thin dielectric multilayer filter therein are conventionally known, such that the component filter of the optical element is interposed within an extremely small gap within the optical pathway of the optical communication system. As an example of such a device, FIG. 23 shows a conventional optical element in which a dielectric multilayer filter is interposed between the end of one optical fiber and that of another, as described by H. Yanagawa et al. ("Filter-Embedded Design and its Applications to Passive Components", IEEE J. Lightwave Technol., vol. LT-7, pp. 1646-53, 1989). FIG. 23(a) is a plan view of the optical element, and FIG. 23(b) is a vertical cross-sectional view of the optical element through the line A—A' shown in FIG. 23(a). In the drawings, the ends of an input optical fiber 1 and an output optical fiber 2 can be seen opposing one another with an intervening dielectric multilayer filter leaf 3 which is situated within a slot 4 formed in a support base 5. In addition to the above mentioned dielectric multilayer filter leaf 3, support base 5 also supports and fixes the ends of the above mentioned input optical fiber 1 and output optical fiber 2.

By utilizing a dielectric multilayer filter leaf 3 having suitable optical characteristics, and appropriately adjusting the angle between dielectric multilayer filter leaf 3 and the optical axis of the optical element as determined by the orientation of the above mentioned groove 4 in support base 5, it is possible to fabricate an optical element which transmits light at one wavelength, and which reflects, and hence blocks, light at another wavelength. In this way, for an input optical fiber 1 in which light propagating therein includes a component having a wavelength given by $\lambda_1$ and a second component having a wavelength given by $\lambda_2$, where light at wavelength $\lambda_1$ is necessary for operation of the optical communication system and light at wavelength $\lambda_2$ is of no use or possibly undesirable, the wavelength $\lambda_2$ component can be selectively blocked by means of the optical element, whereas the wavelength $\lambda_1$ component is transmitted on to the output optical fiber 2 to propagate therein. Under ordinary conditions, light that is reflected backwards at the dielectric multilayer filter leaf 3 and reenters the input optical fiber 1 escapes therefrom via the cladding layer thereof. This rearward reflection can be maximized by carefully choosing the angle formed between the plane in which the dielectric multilayer filter leaf 3 lies and the optical axis of the optical element. In view of the above discussion, it can be seen that this type of optical element effectively transforms output optical fiber 2 into a filtered input optical fiber.

In order to fabricate the above described type of optical element, first of all, an optical fiber is fixed in a groove provided in support base 5 using an optical adhesive agent so as to extend beyond either end of support base 5, the above mentioned groove being parallel to the optical axis of the optical element to be fabricated. After removal of a central portion of the optical fiber within the above mentioned groove, thereby creating input optical fiber 1 and output optical fiber 2 from the single starting optical fiber, a groove is formed in support base 5 which intersects with the optical axis of the optical element, and forms a predetermined angle therewith. The dielectric multilayer filter leaf 3 is then fixed in this groove, again using an optical adhesive agent. By forming input optical fiber 1 and output optical fiber 2 from a single starting optical fiber as described above, assuming that the groove provided therefor is linear, it can be appreciated that the optical axes of input optical fiber 1 and output optical fiber 2 will be aligned with one another, thereby eliminating the need for subsequent alignment procedures.

The optical element of FIG. 23 as described above consists of a single, linear optical pathway with an intervening dielectric multilayer filter. In addition to this kind of device, other types of optical elements are conventionally known which employ dielectric multilayer filters. Examples of optical elements to which the application of one or more dielectric multilayer filters have been considered include multiple pathway optically coupling-splitting devices, wherein two or more optical fibers are brought into close approximation with one another in a parallel arrangement over a portion of their lengths to form an optical coupling region, whereby wavelength dependent optical coupling is achieved. By carefully controlling the physical characteristics of the component optical fibers over the coupling region, for example, index of refraction, presence or absence of cladding, etc., as well as the spatial arrangement of the individual fibers over the coupling region, the wavelength dependent coupling ratio between a pair of component optical fibers in the coupling region can be adjusted, whereby a desired distribution of outgoing light over two or more output optical fibers can be effected, thereby achieving splitting of one or more input optical signals into different wavelength components thereof.

In FIG. 24, one example of the above described type of multiple pathway optically coupling-splitting device is shown, wherein two dielectric multilayer filters are incorporated. The optical element shown in FIG. 24 includes two input optical fibers 6, 7, two output optical fibers 8, 9, an optical coupling region 10, two dielectric multilayer filter leaves 11, 12, a groove 13 wherein dielectric multilayer filter leaves 11 and 12 are inserted, and a base support 14 whereby input optical fibers 6 and 7, output optical fibers 8 and 9 and dielectric multilayer filter leaves 11 and 12 are supported. As described above, the coupling ratio between component optical fibers in the coupling region of this kind of device is known to be wavelength dependent. Thus, when an optical signal having two different wavelength components is supplied to optical coupling portion 10 via input optical fiber 6, depending on the wavelength of each component, and on the wavelength dependent characteristics of optical coupling region 10, it is possible to effect a substantial separation of the two wavelength components, such that a large proportion of one wavelength component is output from the optical element via dielectric multilayer filter leaf 11 and output optical fiber 8, and a large proportion of the other wavelength component is output from the optical element via dielectric multilayer filter leaf 12 and output optical fiber 9. In other words, splitting of the incoming optical signal into individual wavelength components thereof is achieved. Because it is not practical to achieve complete separation of the individual wavelength components of the input optical signal by means of the coupling region alone, in the device shown in FIG. 24, dielectric multilayer filter leaf 11 is incorporated into one of the outgoing pathways, and dielectric multilayer filter leaf 12 is incorporated into the other, whereby the effectiveness of separation according to wavelength can be improved. In addition to the devices shown in FIGS. 23 and 24, many other applications exist for dielectric multilayer filters.

With the conventional devices described above, diffraction may occur in the groove in which the dielectric multilayer filter leaves are mounted, thereby leading to a broadening of the intensity distribution, and hence optical losses. It is possible, however, to limit such optical losses by limiting the thickness of the groove for the dielectric multilayer filter leaves, that is, the length of the optical pathway which lies in the groove. As an example, using an optical fiber of 10 $\mu m$ core diameter with a core-cladding refractive index of 0.3%, a groove thickness on the order of tens of $\mu m$ or less, it is possible to limit diffraction losses which occur at the interstice between the input optical fiber and the output optical fiber to on the order of 0.5 dB. From the above, it can be seen that a correspondingly thin dielectric multilayer filter leaf is necessary to limit diffraction losses.

As is shown in FIG. 25, conventional dielectric multilayer filters consist of a hard base layer 15 with an overlying dielectric multilayer 16. The base layer 15 must be transparent, and must possess smooth surfaces and sufficient mechanical strength. For this reason, optical flat plate glass is often employed, for example, synthetic quartz glass, BK-7, etc., with a thickness of 0.5 mm or greater. The dielectric multilayer 16 consists of alternating low refractive index layers 17 and high refractive index layers 18. In addition to alternating low refractive index layers 17 and high refractive index layers 18, the dielectric multilayer 16 may also incorporate one or more additional layers having an intermediate refractive index between each pair of low refractive index and high refractive index layers 17, 18. For each component layer making up the dielectric multilayer 16, the thickness thereof is great to the extent that wavelengths it must handle are long. Additionally, in order to provide the required spectral characteristics, a fairly large number of individual component layers is necessary. In the case of fiber optic communication systems, the wavelength of light employed therein is ordinarily in the range of from 1.31 to 1.55 $\mu m$, for which reason, the thickness of the dielectric multilayer 16 may reach 10 $\mu m$ in order to provide suitable spectral characteristics. As mentioned previously, the base layer 15 initially has a thickness of 0.5 mm or greater. Accordingly, in order to provide a dielectric multilayer filter leaf having a thickness of on the order of tens of $\mu m$ or less, it is necessary to grind and polish the surface of the base layer 15 opposite the surface thereof adjacent to the dielectric multilayer 16 until the desired overall thickness is achieved, after which the filter sheet thus prepared is cut to produce individual dielectric multilayer filter leaves of the desired size and shape.

Unfortunately, two shortcomings are inherent to the above described type of conventional dielectric multilayer filter. The first difficulty is that the grinding and polishing of the base layer 15 required for their fabrication entails a tremendous amount of precision manual labor, for which reason these filters are exceedingly expensive. Also, due to the fact that the base layer must be extremely reduced thickness in order to provide a dielectric multilayer filter leaf having a thickness of on the order of tens of $\mu m$ or less, hence making this base layer exceedingly fragile.

The second shortcoming relates to the fact that conventional ion assist vapor deposition methods are employed so as to provide a dielectric multilayer with highly uniform wavelength dependent optical characteristics. As a result, there is a tendency for residual compression stress to be present in the dielectric multilayers after the ion assist vapor deposition processing which secondarily leads to warping and curling thereof, for which reason grinding and polishing to produce a sufficiently thin filter can not be carried out. Examination of the graph of FIG. 26 will help to clarify the above point. FIG. 26 displays actual measurements taken using a talystep from the upper surface of the dielectric multilayer of two dielectric multilayer filters. In this graph, the curve labeled A is from a dielectric multilayer filter which was subjected to ion assist processing, and the line labeled B is from a dielectric multilayer filter which was not subjected to ion assist processing, but rather, underwent conventional vapor deposition. Both the dielectric multilayer filter corresponding to curve A, and the dielectric multilayer filter corresponding to line B included a base layer of 0.5 mm thick BK-7 glass, and the dielectric multilayer of each had a thickness of approximately 10 $\mu m$ and was made up of alternating layers of $TiO_2$ and $SiO_2$ for the purpose of separating an input signal into a 1.3 $\mu m$ wavelength component and a 1.55 $\mu m$ wavelength component. As FIG. 26 shows, the dielectric multilayer filter corresponding to curve A developed marked curling with a large central protuberance.

Investigation of the effect on the spectral characteristics of each of the two above described dielectric multilayer filters of varying humidity at 0% and 100% was also carried out, yielding the results shown in the graph of FIG. 27. As can be seen, sample B showed a variation of up to 25 nm, whereas sample A had exceedingly stable characteristics in response to differing levels of humidity. This finding relates to the fact that sample B has a more porous microstructure than that of sample A, such that water is able to enter the filter resulting in changes of the refractive index thereof. From FIGS. 26 and 27, it can be seen that while dielectric multilayer filters manufactured using conventional vapor deposition are more resistant to warping secondary to internal residual stress, dielectric multilayer filters manufactured using ion assist processing are more resistant to water vapor, and hence, more stable under conditions of varying humidity.

Comparison of the results of grinding and polishing revealed that the base layers of sample A filters were very susceptible to fracture as they were reduced to smaller and smaller thicknesses, such that no filters without cracking were produced when the overall thickness of the filter was polished down to the required thickness of on the order of tens of $\mu m$ or less. Conversely, the B sample filters could be successfully reduced to a thickness of 20 $\mu m$. Thus, only the sample B filters which are vulnerable to humidity induced variations in spectral characteristics can be reduced to a suitable thickness by conventional methods.

Because of the exceptional expense involved in producing dielectric multilayer filters by conventional methods which require reduction of thickness by grinding and polishing, the present inventors investigated methods whereby it is possible to produce such filters having the desired thickness from the onset without need of such treatment. Several types of dielectric multilayer filters were examined consisting of a plastic film base layer, over which a multilayer interference membrane is applied, such as those disclosed by Sugiyama et al. (Japanese Patent Application, First Publication Serial No. Sho-63-64003), and that of J. A. Dobrowolski et al. (*Applied Optics*, vol. 28, no. 14, pp. 2702). The filters of both of the above two cited references were had a multilayer interference membrane consisting of on the order of twenty individual layers, each individual layer approximately 0.2 $\mu$m thick. The filters of the former reference are produced by the so-called roll application method and are stored in roll form after manufacture thereof. Such filters have a rather nonuniform thickness of the multilayer interference membrane, and the multilayer interference membrane is prone to cracking and peeling away from the base layer under storage conditions. In the case of the filter disclosed by Sugiyama et al., a polyester film base layer having a thickness of 100 $\mu$m is employed in order to provide adequate mechanical strength. Thus it can be seen that neither of the above two previously described filter materials is adequate for the purposes of the present invention.

During research to develop filter having a multilayer structure overlying a suitably strong and physically stable plastic film, the present inventors investigated using a thin plastic film polyimide layer which is applied over a conventional base layer of glass or the like, followed by application of the multilayer structure using an ion assist method, after which the resulting product is stripped away from the underlying glass layer. The material for the thin plastic film polyimide layer was selected so as to provide a material which can be applied over the glass layer using conventional painting or other liquid application means, and which is exceptionally resistant to high temperatures which occur during vapor deposition processes. For this purpose, an attempt was made to use commercially available polyimide resin compositions which were then spin coated over a 0.5 mm thick layer of BK-7 glass, followed by application of alternating layers of $TiO_2$ and $SiO_2$ by an ion assist vapor deposition method. This resulted in a polyimide base layer which was suitably adherent to the overlying multilayer, however, the polyimide base layer was excessively adherent to the glass layer and could not be successfully stripped therefrom.

It was then attempted to apply the the polyimide base layer over a silicon layer which has a very smooth, even surface. In this case, the resulting polyimide base layer and overlying multilayer could be stripped from the silicon by gradually introducing the tip of a sharp blade therebetween, but the stripped optical filter material curled up and was very difficult to handle. The above described curling occurred with the multilayer at the convex aspect of the curled material, and was thought to be secondary to a difference in the thermal expansion coefficient of the polyimide layer and that of the multilayer. Thus, with the polyimide layer having a listed thermal expansion coefficient of $2\times 10^{-5}/C.°$, and the multilayer having a thermal expansion coefficient of on the order of from $0.4\times 10^{-5}/C.°$ to $0.5\times 10^{-5}/C.°$, after cooling from the temperature at which ion vapor deposition is carried out (approximately 200 C.°), the polyimide layer contracts to a greater degree than the multilayer. This interpretation was substantiated by the fact that the curled material flattened out again upon reheating.

SUMMARY OF THE INVENTION

In view of the above findings, it is an object of the present invention to provide a dielectric multilayer filter which can be easily and economically produced at a suitably small thickness, exhibits highly uniform physical and optical properties, and which is exceedingly durable and resistant to curling and warping. Accordingly, the dielectric multilayer filter of the present invention incorporates a fluorinated polyimide base layer which is characterized by having a lower thermal expansion coefficient than conventional polyimide material. Additionally, such material is readily strippable from a smooth and even underlying layer, without curling and cracking, and at the same time, adheres tightly to an overlying dielectric multilayer applied by ion assist vapor deposition methods.

To accomplish the above object, the present invention provides a dielectric multilayer filter with a fluorinated polyimide base layer with a dielectric multilayer formed thereover. Additionally, the present invention provides a fabrication method for such a dielectric multilayer filter, incorporating the steps of forming a fluorinated polyimide layer by applying liquid fluorinated polyimide material over a smooth surface to a predetermined thickness followed by drying and hardening; forming a dielectric multilayer over the fluorinated polyimide layer; and stripping the fluorinated polyimide layer away from the underlying smooth surface.

As a result of the above, the present invention eliminates the need for grinding and polishing of the base layer in order to reduce the thickness thereof, whereby much faster and more efficient production of dielectric multilayer filters becomes possible, thereby considerably reducing the expense thereof. Furthermore, an ion assist vapor deposition method can be employed for formation of the dielectric multilayer, resulting in considerable improvement in the physical stability of this layer. Moreover, because the fluorinated polyimide layer has a relatively low thermal expansion coefficient, the difference between the thermal expansion coefficient of the fluorinated polyimide layer and that of the dielectric multilayer is reduced, thereby limiting the development of residual stress in the finished product, as well as limiting curling for easy handling thereof. Additionally, the fluorinated polyimide layer is exceeding transparent and easily strippable from the underlying smooth surface.

BRIEF DESCRIPTION OF THE DRAWINGS

FIG. 15 is an cross-sectional view of a fourth embodiment of an optical element in accordance with the present invention. FIG. 16(a) is a longitudinal cross-sectional view of a fifth embodiment of an optical element in accordance with the present invention, and FIG. 16(b) is an axial cross-sectional view through the line D—D' seen in FIG. 16(a).

DESCRIPTION OF THE PREFERRED EMBODIMENTS

In the following, the preferred embodiments of the present invention will be described with reference to the drawings.

Figure 1:
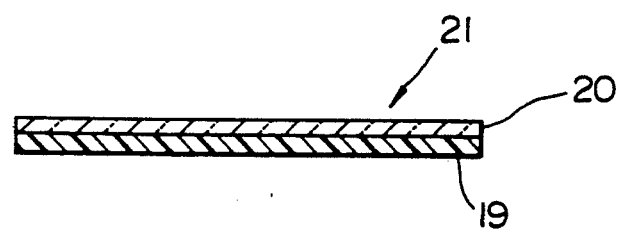
FIG. 1 is a cross-sectional view of a dielectric multilayer filter in accordance with the present invention.

FIG. 1 shows a cross-sectional view of a dielectric multilayer filter 21 in accordance with the present invention. As can be seen in this drawing, the dielectric multilayer filter 21 consists of a fluorinated polyimide layer 19 which serves as a base layer, with an overlying dielectric multilayer 20.

Figure 2:
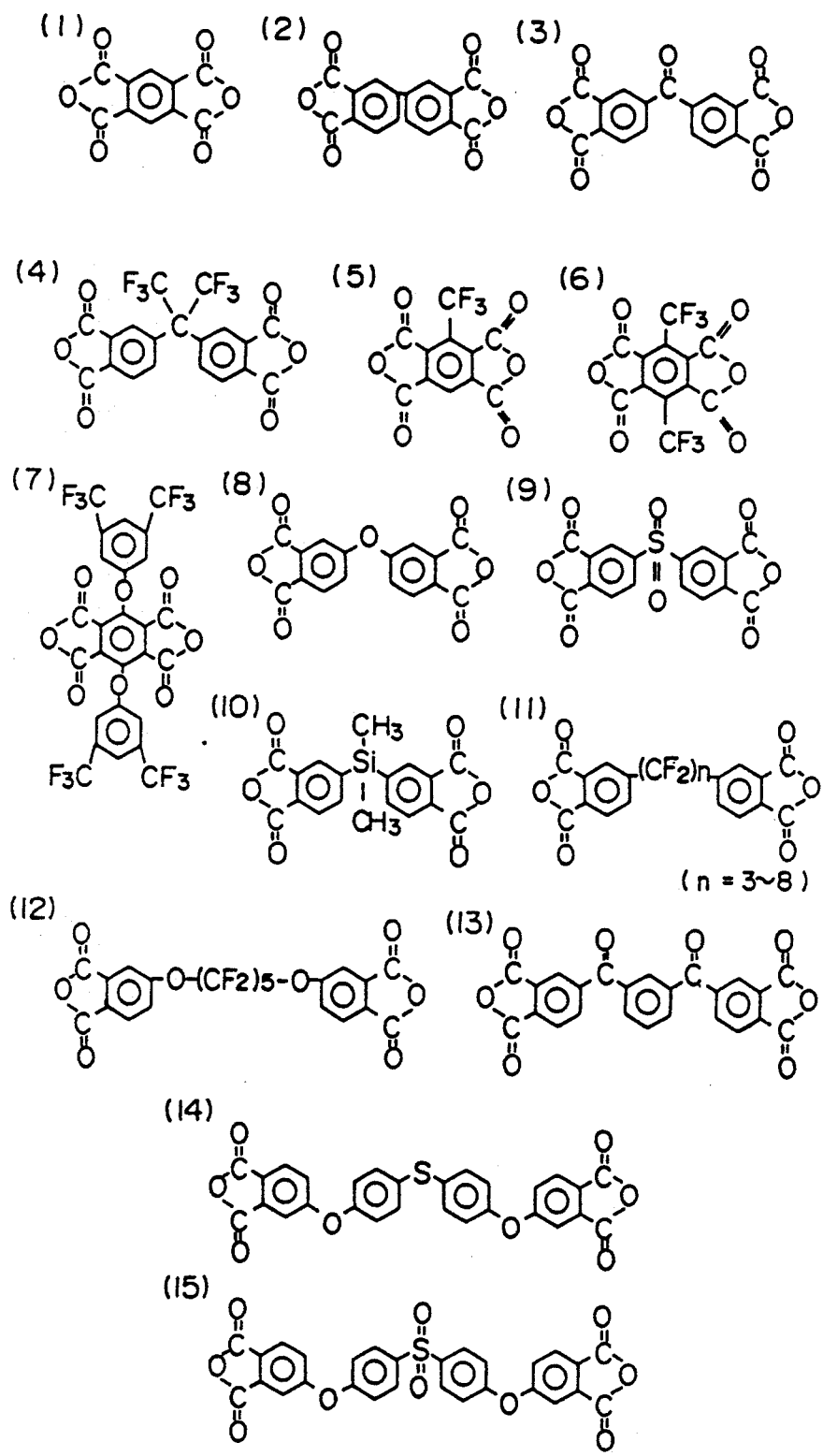
FIG. 2 illustrates the chemical structures of fifteen dianhydrides applicable as starting material for fluorinated polyimides employed in the present invention.
Figure 3:
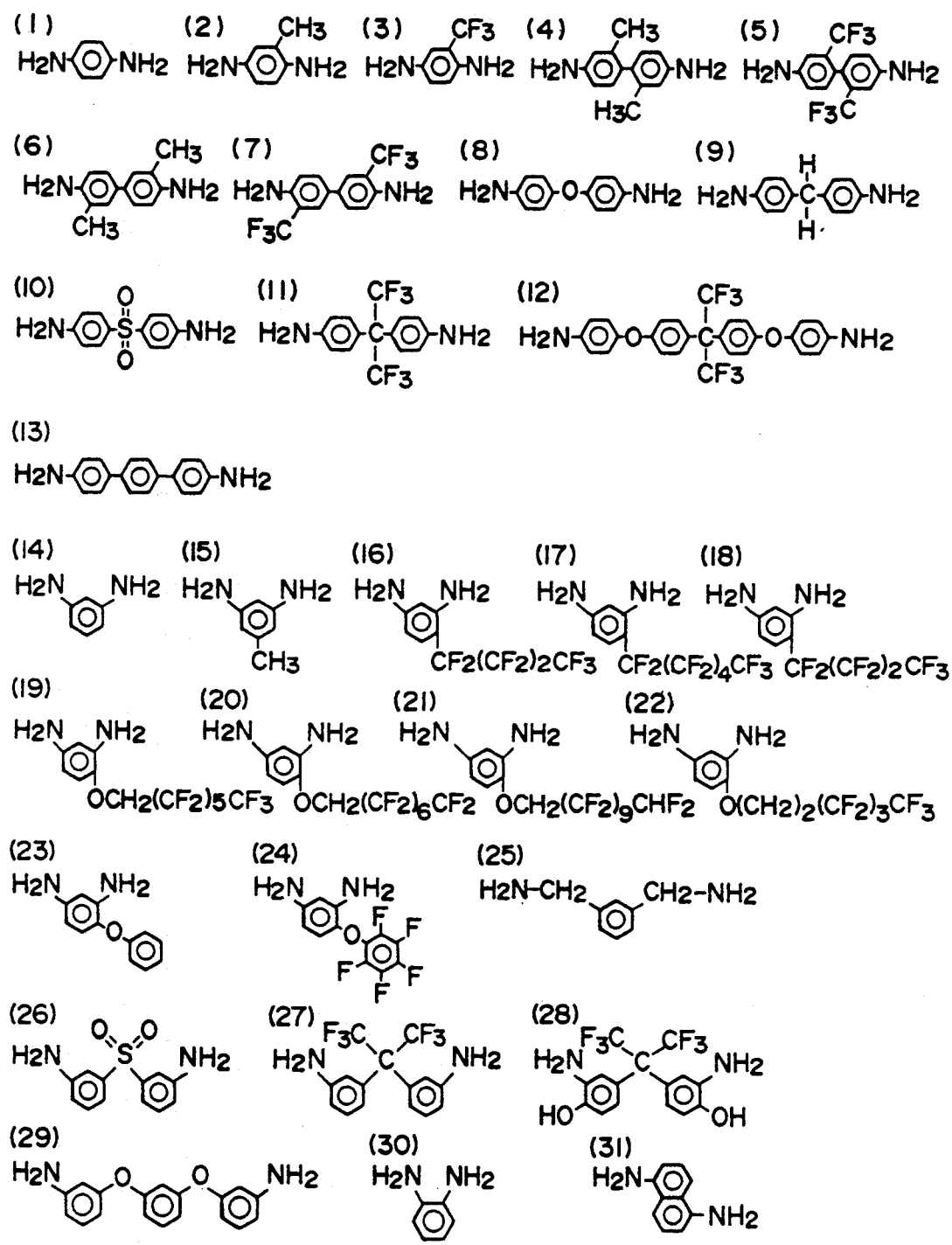
FIG. 3 illustrates the chemical structures of thirty one diamines applicable as starting material for fluorinated polyimides employed in the present invention.

FIG. 2 illustrates the chemical structures of acid dianhydrides (1) through (15) which are applicable as a starting material for different fluorinated polyimide compounds which can be employed in the present invention. FIG. 3 illustrates the chemical structures of diamine compounds (1) through (31) which are applicable as a second starting material for fluorinated polyimides which can be employed in the present invention.

To prepare the fluorinated polyimides of the present invention, first of all, one or more of the acid dianhydrides (1) through (15) shown in FIG. 2 are reacted with one or more of the diamine compounds (1) through (31) shown in FIG. 3 in a 1:1 molecular ratio in a polar organic solvent such as N-methyl pyrrolidone (NMP), N,N-dimethyl acetamide (DMAc) and the like, yielding a solution of a precursor polyamido acid. Next, while heating the reaction mixture, a dehydration reaction occurs, thereby producing fluorinated polyimide compound as water is driven off the heated solution. Depending on the characteristics of the synthesized fluorinated polyimide compound and the concentration thereof, the compound may remain in solution, or may appear as a second phase. When a solution of the fluorinated polyimide compound is produced, the solution may be used in later steps with no need for isolation of the fluorinated polyimide compound.

Figure 4A:
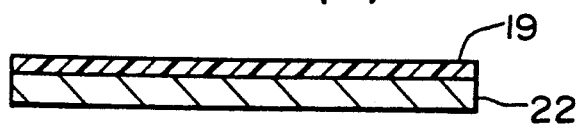
FIG. 4*a–d* is a series of cross-sectional views showing a fabrication method for a dielectric multilayer filter in accordance with the present invention.
Figure 4B:
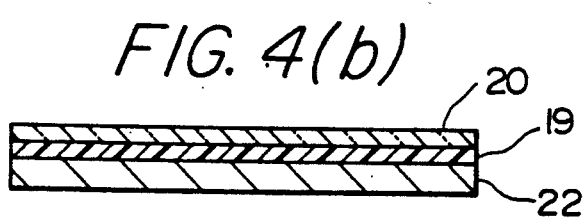
Figure 4C:
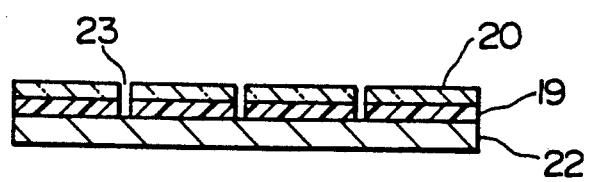
Figure 4D:
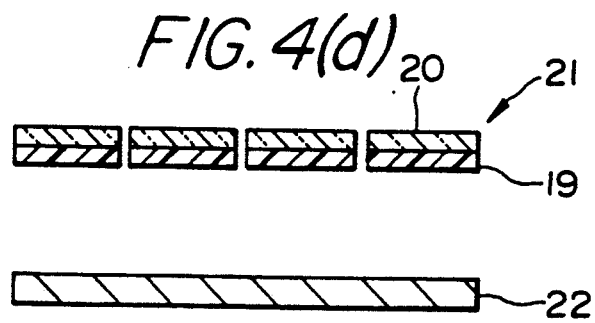

FIGS. 4(a) through 4(d) show a dielectric multilayer filter at various stages of the manufacture thereof. The first step involves application of fluorinated polyimide compound as a liquid over a smooth surface base plate 22 at a prescribed thickness. When the fluorinated polyimide layer 19 is applied in this first step, in order to achieve a uniformly thin layer thereof, the layer is applied by spin coating using a solution or liquid form of the fluorinated polyimide. Having been applied, the layer is then dried and hardened, thereby yielding the solid fluorinated polyimide layer 19 over the smooth surface base plate 22 as shown in FIG. 4(a). Next, as shown in FIG. 4(b), the dielectric multilayer 20 is formed over the fluorinated polyimide layer 19 by means of an ion assist vapor deposition method. Next, the layered structure is cut to a depth up to the base plate 22, resulting in the slices 23 shown in FIG. 4(c). Finally, the fluorinated polyimide layer 19 and dielectric multilayer 20 are together stripped away from the base plate 22 as is shown in FIG. 4(d). As shown in FIGS. 5(c) and 5(d), the fluorinated polyimide layer 19 and dielectric multilayer 20 may be first stripped away from the base plate 22, and then cut in to sections, rather than prior to the stripping step.

Figure 5A:
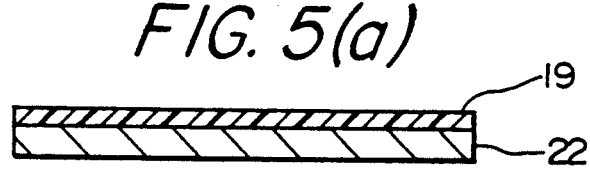
FIG. 5a–d is a series of cross-sectional views showing another fabrication method for a dielectric multilayer filter in accordance with the present invention.
Figure 5B:
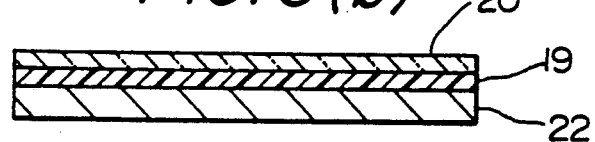
Figure 5C:
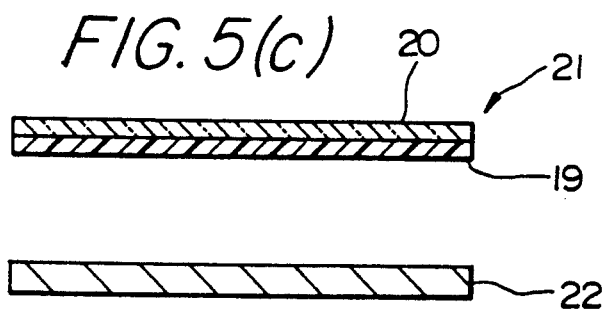
Figure 5D:
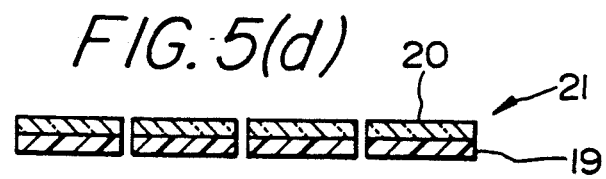

The fluorinated polyimide layer 19 shown in FIGS. 4(a) and 5(a) should have a linear thermal expansion coefficient in the range of from $-0.5 \times 10^{-5}/C.°$ to $10 \times 10^{-5}/C.°$. The majority of dielectric materials used in optical multilayers lie within this range. The index of refraction of such materials generally lies with in the range of from 1.5 to 1.7, depending upon the relative amount of fluorine therein. For the smooth surface base layer 22, BK-7 glass, quartz glass, ceramic material and the like are applicable, and the greater the chemical stability and resistance to scratching thereof, the better. When measurement of the spectral characteristics of this kind of filter is carried out during manufacture thereof, the measurements are generally carried out while the filter is still adherent to the base plate 22 as shown in FIGS. 4(b) and 5(b), for which reason optically neutral properties are desirable.

FIRST EXPERIMENTAL EXAMPLE

A dielectric multilayer filter was manufactured according to the method described above. Over a 30 mm diameter 0.5 mm thick BK-7 glass plate, a fluorinated polyimide layer was applied. The material for the layer was prepared by mixing the acid dianhydride (1) shown in FIG. 2 and the diamine (5) shown in FIG. 3 in DMAc, and reacting so as to yield a DMAc solution of the corresponding fluorinated polyamido acid. This solution was then applied to a surface of the glass plate by spin coating, after which the plate and applied layer were subjected to heating for 2 hr. in a 70° C. oven, after which drying and hardening was carried out at 160° C. for 1 hr., 250° C. for 30 min., and 350° C. for 1 hr. to yield a layer comprised of the fluorinated polyimide compound having the structure shown in chemical structure diagram (i) below:

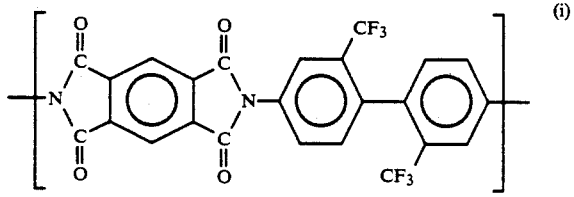

Figure 6:
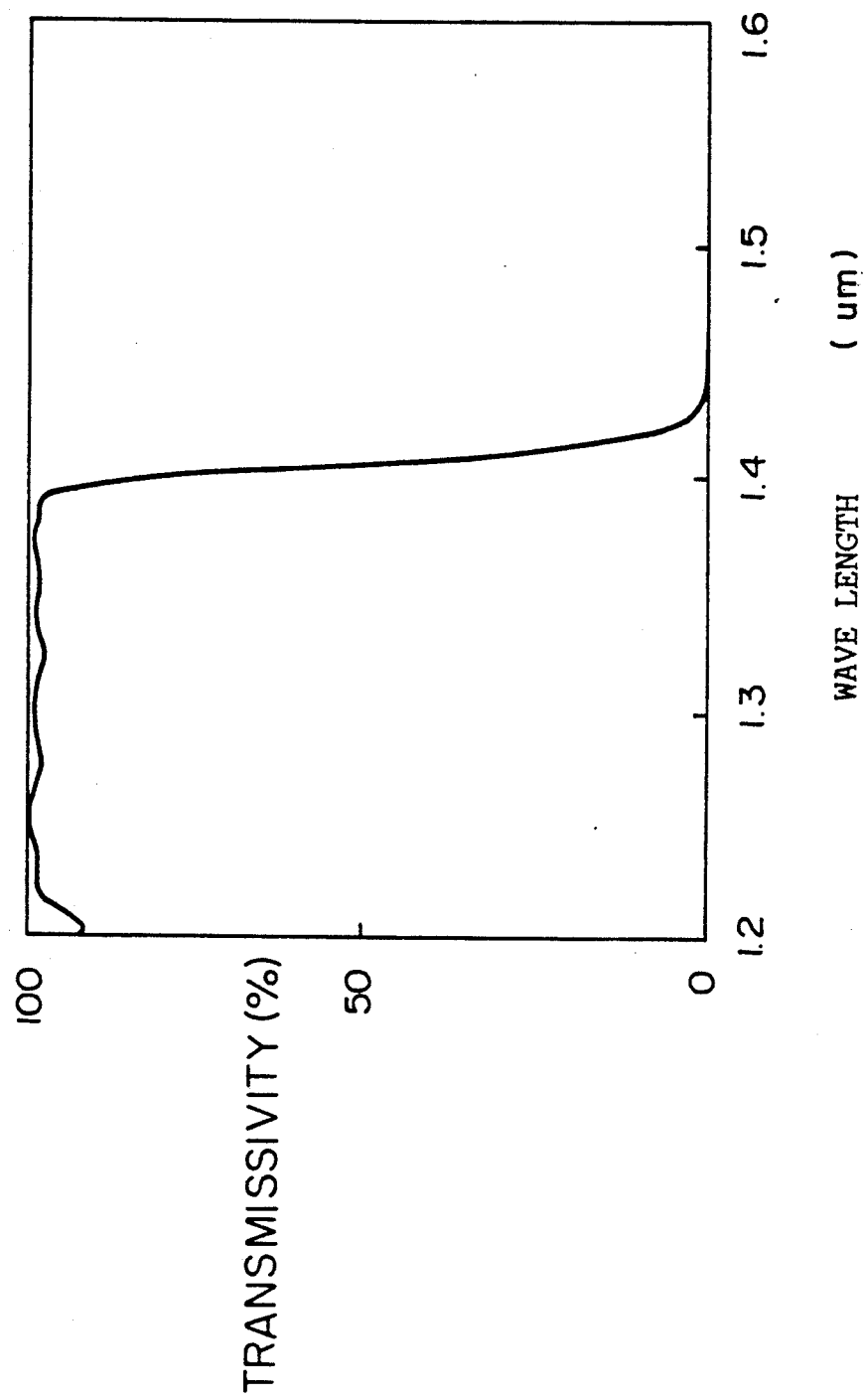
FIG. 6 is a graph showing experimentally measured values for percent transmissiosn as a function of wavelength for a short wavelength pass filter (SWFP).
Figure 7:
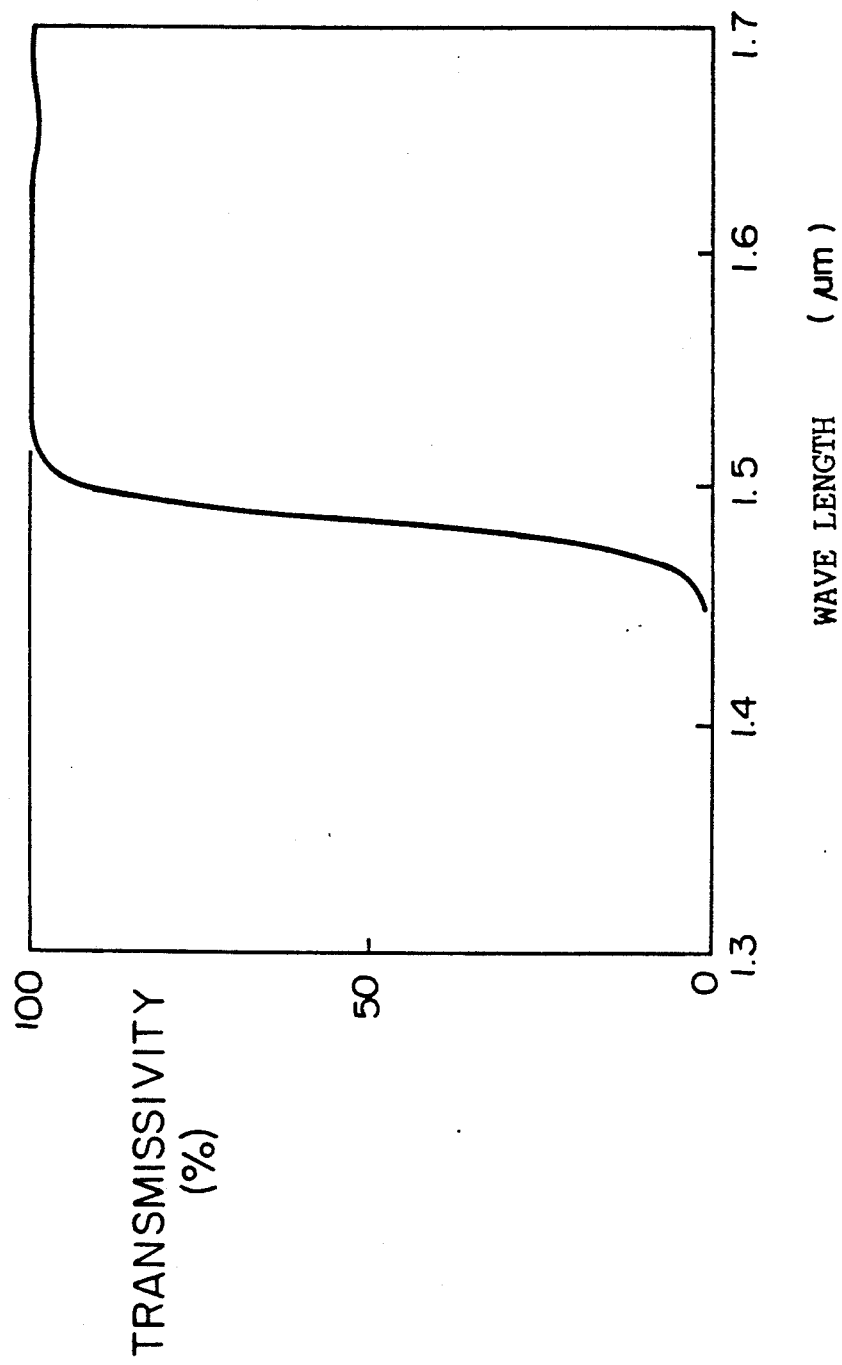
FIG. 7 is a graph showing experimentally measured values for percent transmission as a function of wavelength for a long wavelength pass filter (LWFP).
Figure 8:
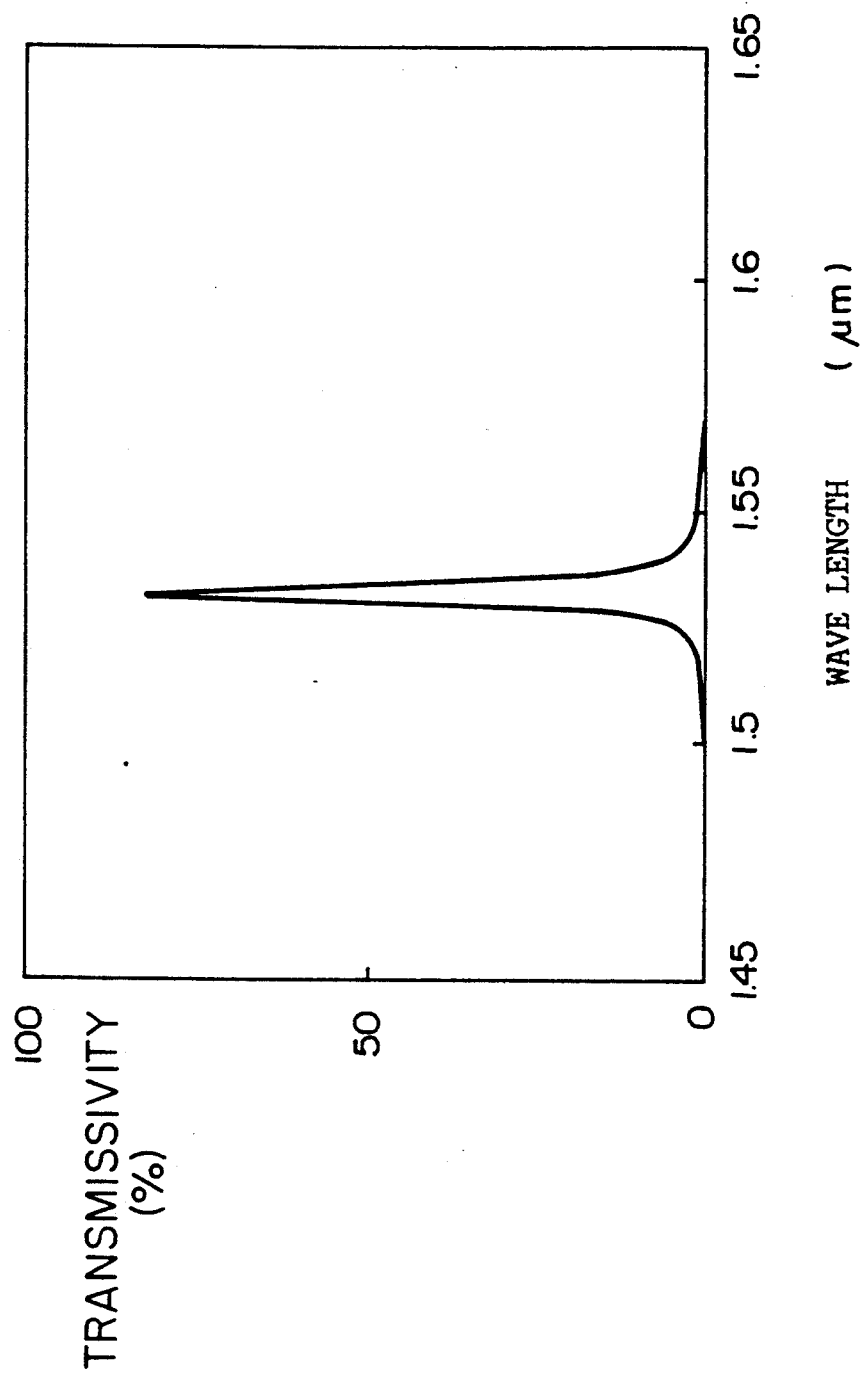
FIG. 8 is a graph showing experimentally measured values for percent transmission as a function of wavelength for a narrow bandwidth optical filter.

The compound shown in structure diagram (i) had a fluorine content of 23 weight %. The obtained fluorinated polyimide layer had a yellow tinge, and demonstrated essentially 100% transmission over the wavelength range of from 0.4 to 1.7 $\mu$m. The thickness thereof was approximately 10 $\mu$m, and the refractive index was 1.61 at 1.532 $\mu$m. Next, using ion assist vapor deposition, multiple $TiO_2/SiO_2$ interference layers of a thickness of approximately 10 $\mu$m were applied over the fluorinated polyimide layer. The spectral characteristics of the dielectric multilayer filter thus obtained were found to be essentially the same as those prepared using optical glass in place of the fluorinated polyimide layer, the results of which are shown in FIG. 6. Additionally, a 1.3/1.55 $\mu$m long wavelength pass filter (LWPF) and narrow wavelength band pass filter (4 nm bandwidth) were prepared, and for these as well, the spectral characteristics thereof were found to be similar to those prepared using optical glass. The results are shown in FIGS. 7 and 8, respectively.

From the above described characteristics of the experimentally prepared dielectric multilayer filters, it can be seen that the precision characteristics of conventional filters using a base layer of glass were equalled by the filters of the present invention. Additionally, because virtually no handling is necessary with the method of the present invention, for which reason there was no problem of the fluorinated polyimide layers separating from the glass base plates, and even after immersion in water for up to seven days, no separation occurred. However, when the above described sectioning of the fluorinated polyimide layer and dielectric multilayer was carried out using a sharp blade, the cut edge was easily lifted away from the glass base plate, thereby yielding 30 mm diameter, approximately 20 $\mu$m thick flat filters. The separated filters demonstrate very slight curling at room temperature with the convexity on the side of the dielectric multilayer, the radius of curvature approximately 0.3 m. For this reason, the filters could be easily cut with scissors, and glued to a glass plate. The minimal curling exhibited can be explained on the basis of the fact that fluorinated polyimide compounds have a negative coefficient on the order of $-0.5 \times 10^{-5}/C.°$, which is close to that of the dielectric multilayer. Because stretching forces exerted by the fluorinated polyimide layer is slightly greater than that of the dielectric multilayer both at the temperature of ion assisted vapor deposition and at ordinary temperatures, the problem of residual compression stress in the dielectric multilayer is practically eliminated. In fact, when one of this filters is placed on a 100 C.° hot plate, the curling will increase somewhat, after which the the filter will revert to its original conformation upon cooling, thus mimicking the so-called bimetal effect.

Figure 9:
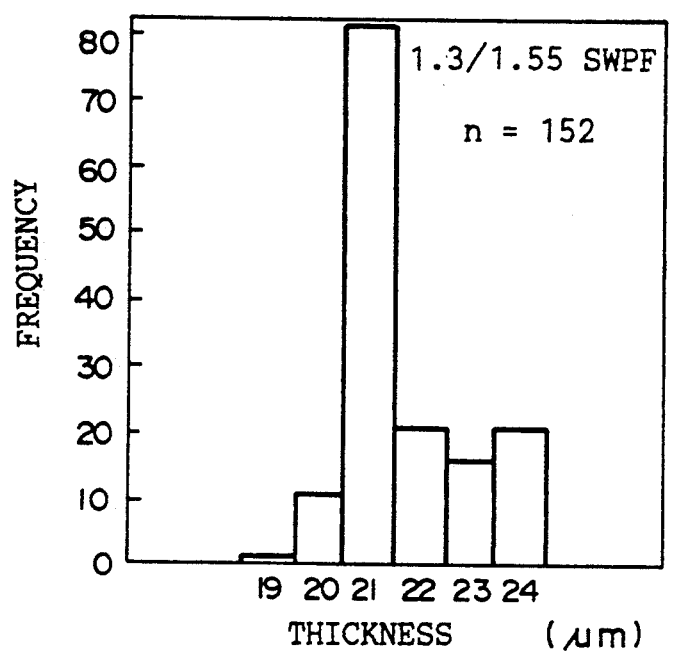
FIGS. 9 and 10 are bar graphs showing the thickness of experimentally prepared dielectric multilayer filter.
Figure 10:
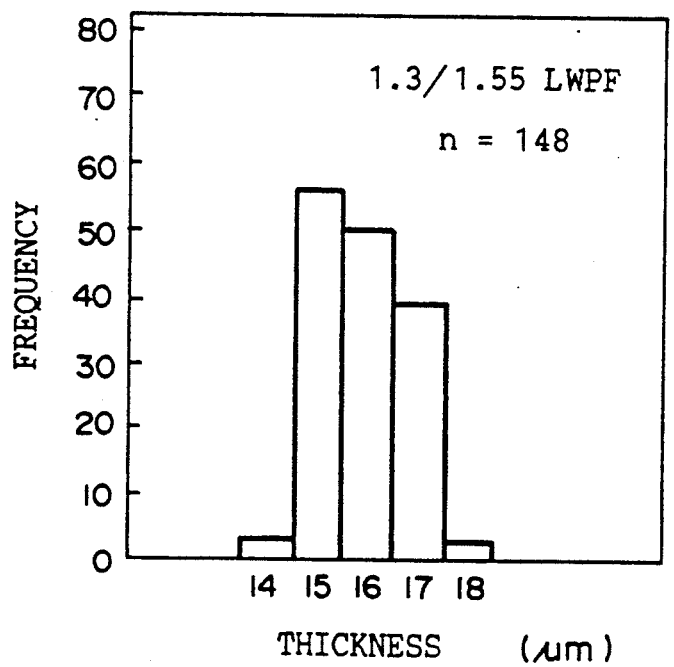

Samples of manufactured dielectric multilayer filters still adherent to the glass base plate were subjected to partial thickness sectioning into a 2 mm by 2 mm checkerboard pattern using a dicing saw while exposing the surface to a stream of water. During this sectioning, no separation between the fluorinated polyimide layer and the glass base plate occurred. However, using a sharp knife blade, the individual 2 mm by 2 mm sections could be easily lifted away from the base plate with no tearing. Thus, from a single 30 mm diameter sample, approximately 150 2 mm by 2 mm individual filter sections could be obtained, each having a thickness of 20 $\mu$m. The thickness of the filter sections thus obtained were individually measured using a linear gauge, the results of which are shown in FIGS. 9 and 10, which correspond to the filters for which the characteristics thereof are shown in FIGS. 6 and 7, respectively. As shown in FIGS. 9 and 10, there were two peaks in the distribution of thickness, such that filter sections having a thickness of 21 $\mu$m and 15 $\mu$m were most common. These filter sections were from the central portions of the 30 mm diameter wafers. The filter sections which were somewhat thicker than 15 $\mu$m, and those which were somewhat thicker than 21 $\mu$m were from peripheral portions. All most all of the sections had a thickness within $\pm 2$ $\mu$m of the median thickness. The uniformity in thickness obtained was on the same level as that for dielectric multilayer filters employing a glass base layer which required grinding and polishing to achieve a suitable thickness. The high consistency achieved was attributable to the fact that spin coating was used to apply the fluorinated polyimide layers. The conditions of spin coating can be adjusted so as to achieve any desired thickness for the fluorinated polyimide layer between 1 and 80 $\mu$m.

SECOND EXPERIMENTAL EXAMPLE

A fluorinated polyimide material was prepared by mixing the acid dianhydride (5) shown in FIG. 2 and the diamine (13) shown in FIG. 3 in DMAc, from which dielectric multilayer filter wafers were obtained under conditions otherwise identical to those of Experimental Example 1. The fluorinated polyimide layer had a fluorine content of 11 weight %, a thermal expansion coefficient of $1 \times 10^{-6}/C.°$, and the structure shown in chemical structure diagram (ii) below:

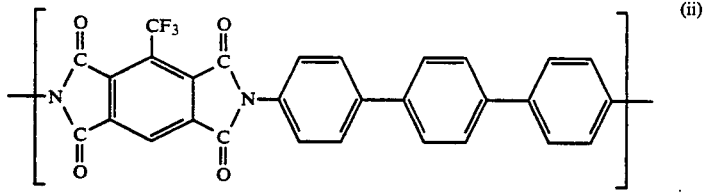

(ii)

Curling in the filters after separation from the glass base plate was slightly more than that which occurred with the First Experimental Example, although the filters were usable.

COMPARATIVE EXAMPLE

A fluorinated polyimide material was prepared from acid dianhydride (4) in FIG. 2 and diamine (5) in FIG. 3, from which dielectric multilayer filter wafers were obtained under conditions otherwise identical to those of Experimental Example 1. The fluorinated polyimide layer had a fluorine content of 31 weight %, an index of refraction of 1.5, close to that of glass, a transparent appearance, and the structure shown in chemical structure diagram (iii) below:

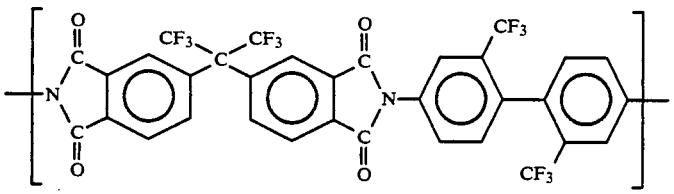

(iii)

The prepared filters could be easily separated from the glass base plate, but because of the large fluorine content, the dielectric multilayers readily separated from the fluorinated polyimide layer. Additionally, the thermal expansion coefficient of the fluorinated polyimide layers was quite large at $8 \times 10^{-5}/C.°$, and was significantly different from that of the dielectric multilayers at $0.4 \times 10^{-5}/C.°$ to $0.5 \times 10^{-5}/C.°$, for which reason it was thought that residual stress in the fluorinated polyimide layer of filters obtained therefrom would be significant.

In the following, the optical elements of the present invention will be described with reference to the drawings.

Figure 11A:
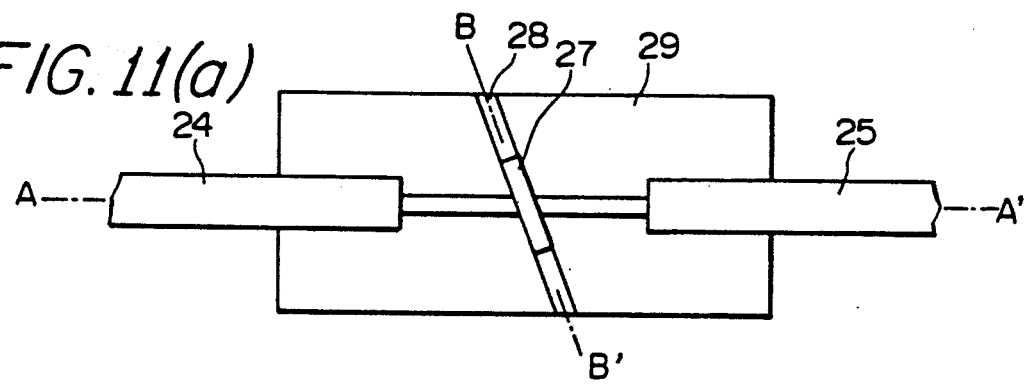
FIG. 11(a) is a plan view of an optical element in accordance with the present invention.
Figure 11B:
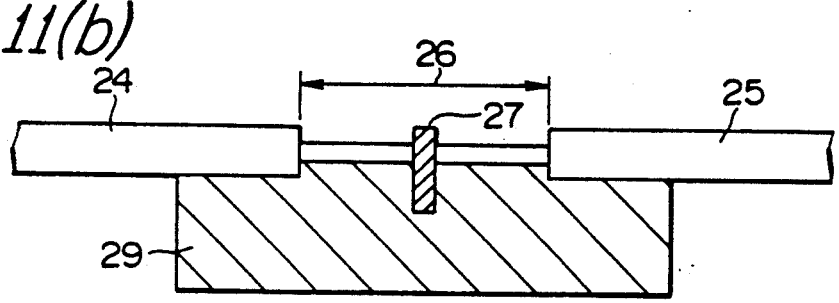
FIG. 11(b) is a cross-sectional view through the line A—A' seen in FIG. 11(a).

FIGS. 11(a) and 11(b) show a first preferred embodiment of an optical element of the present invention. FIG. 11(a) is a plan view of the optical element, and FIG. 11(b) is a cross-sectional view through the line A—A' seen in FIG. 11(a). An input optical fiber 24 and an output optical fiber 25 can be seen in the drawings. In central region 26 of the optical element, the protective coating has been removed from a portion of each fiber where the ends thereof oppose one another across a groove 28 wherein a dielectric multilayer filter 27 having a fluorinated polyimide base layer is situated. The above mentioned groove 28 is provided in support base 29 which additionally holds input optical fiber 24 and output optical fiber 25 in another groove provided therefor. In order to construct the optical element, an optical fiber is fixed in the groove provided in support base 29 therefor using an optical adhesive agent after aligning the optical axes thereof. The above mentioned groove 28 is formed in support base 29 so as to completely cut the fiber, thereby creating an input optical fiber 24 and an output optical ber 25 with mutually aligned optical axes. As can be best appreciated from FIG. 11(a), the dielectric multilayer filter 27 deviates by 8° from a perpendicular relationship with the aligned optical axes of optical fibers 24, 25. Finally, the dielectric multilayer filter 27 is fixed in groove 28 using an adhesive agent suitable for optical devices.

Figure 12:
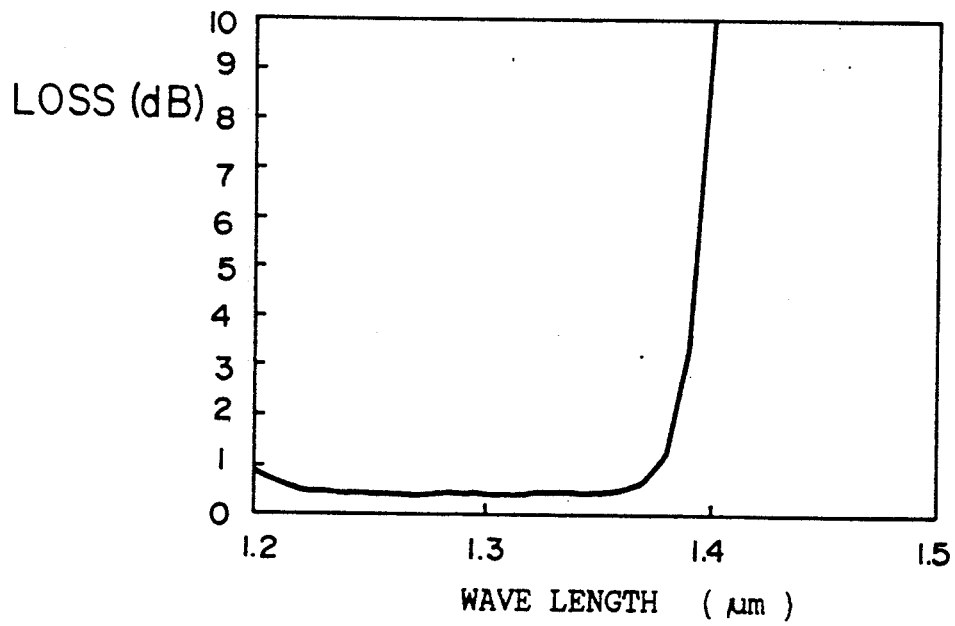
FIG. 12 is a graph illustrating the spectral characteristics of the optical element shown in FIGS. 11(a) and FIG. 11(b).

The optical characteristics of the above described filter are demonstrated in the graph of FIG. 12, wherein the wavelength dependent drop in intensity of light output from output optical fiber 25 is shown relative the intensity of the same wavelength component in a white light signal input to input optical fiber 24.

The dielectric multilayer filter is identical to those prepared in the First Experimental Example. Optical fibers 24, 25 each had a core diameter of 10 μm, cladding with an external diameter of 125 μm, and a core - cladding refractive index of 0.3%. Compared with the filter having the optical characteristics shown in FIG. 6, losses due to diffraction of light transmitted therethrough are increased. Additionally, due to the fact that the dielectric multilayer filter 27 deviates by 8° from a perpendicular relationship with the aligned optical axes of optical fibers 24, 25, the cut off point for dielectric multilayer filter 27 is shifted slightly toward shorter wavelengths. Using fifty different input optical fibers manufactured by an identical process in the optical element of FIG. 11 and the measuring transmission losses of the element for each case, the results demonstrated losses of 0.5 dB or less for every fiber at 1.3 μm and losses of 55 dB or greater for every fiber at 1.55 μm. Such characteristics make this type of filter applicable to systems for measuring the impairment of propagation in an optical pathway using an optical time domain refractometer (OTDR), for example, so as to eliminate spurious readings due to extraneous light, or light generated within the apparatus (H. Takasugi et al., "Design and Evaluation of Automatic Optical Fiber Operational Support Systems", Proceedings of the 39th International Wire and Cable Symposium, 1990, pp. 632). Also, measurements at temperatures varying from 25° to 70° C. over a four hour cycle repeated 200 times demonstrated remarkable stable optical characteristics for this dielectric multilayer filter.

Figure 13:
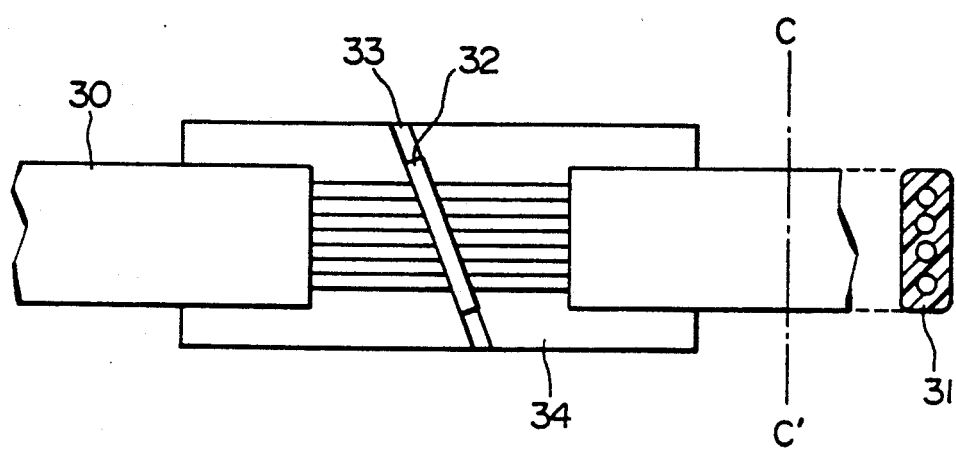
FIG. 13 is a plan view of a second embodiment of an optical element in accordance with the present invention.

FIG. 13 shows a second preferred embodiment of the optical element of the present invention. This optical element differs from that shown in FIGS. 11(a) and 11(b) in that a plurality of optical fibers are employed in the present embodiment. In this drawing, a fiber band 30 can be seen. When viewed in cross-section, it can be appreciated that each component fiber in the fiber band 30 is separated from adjoining component fibers by a constant distance. A common protective layer 31 surrounds all of the component optical fibers.

For the fiber band 30, generally two to eight component fibers are employed in a parallel arrangement, each consisting of 125 m external diameter optical fibers, separated from one another by an interval of 250 m. The above described fiber arrangement is compatible with standards set by the Japan Nationwide Electronic Data Communications Conference (B-649, B-654, B-655, and others). Again referring to FIG. 13, dielectric multilayer filter 32 is seen which incorporates a fluorinated polyimide base layer. A groove 33 is provided in a support base 34 for mounting the above mentioned dielectric multilayer filter 32. In the present embodiment, a dielectric multilayer filter 32 identical to that used in the first preferred embodiment can be suitably employed.

Figure 14:
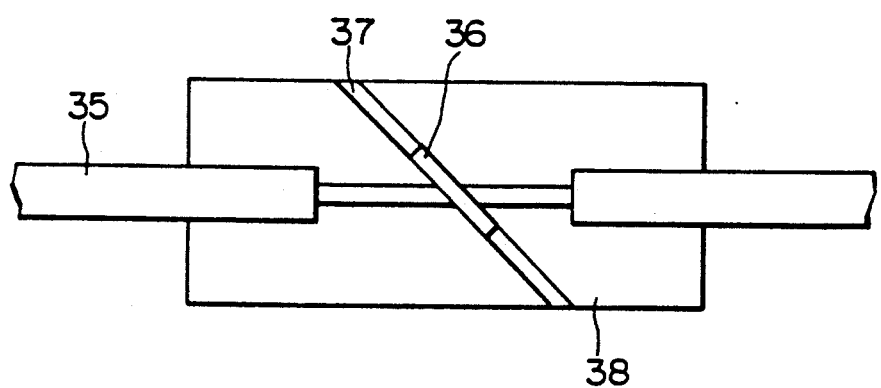
FIG. 14 is a plan view of a third embodiment of an optical element in accordance with the present invention.

FIG. 14 shows an optical element in accordance with a third preferred embodiment of the optical element of the present invention, which is applicable to devices acting as a polarizer. In this drawing, a polarization maintaining optical fiber 35, a dielectric multilayer filter 36 with a fluorinated polyimide base layer, groove 37, and base support 38 can be seen. The groove 37 wherein the dielectric multilayer filter 36 is vertically mounted on base support 38 forms an angle of 45° with the optical axis of the optical element so as to enhance the polarization effect in dielectric multilayer filter 36. The plane of polarization of maintaining optical fiber 35 is aligned so as to be oriented at an angle of either 0° or 90° with respect to base support 38. Thus, only incident light from polarization maintaining optical fiber 35 which is oriented in parallel to base support 38 can pass through the optical element.

FIG. 15 shows an optical element in accordance with a fourth preferred embodiment of the optical element of the present invention. In this drawing, a ferrule formed by zirconia ceramic male portion 39 and stainless steel female portion 40, an optical fiber 41, a filter 42 with a fluorinated polyimide base layer, groove 43 wherein filter 42 is mounted, and optical adhesive agent 44 can be seen. The above described ferrule structure makes this optical element to optical fiber connectors and the like. Additionally, the ferrule makes it possible to connect this optical element with various other types of fiber optic equipment.

FIG. 16 shows an optical element in accordance with a fifth preferred embodiment of the optical element of the present invention. In this drawing, an optical fiber 45, a ferrule 46 for receiving the end of optical fiber 45, and a filter 47 with a fluorinated polyimide base layer can be seen. A sleeve 48 fits over ferrule 46, whereby the position of the end point of optical fiber 45 can be adjusted with precision. The end surface of ferrule 46 within sleeve 48 can be perpendicular to the optical axis of optical fiber 45, or can be at an angle therewith, or have a spherical shape. The configuration of the present embodiment facilitates connecting an optical fiber device with various other types of devices with a predetermined accurate and reliable alignment.

Figure 17:
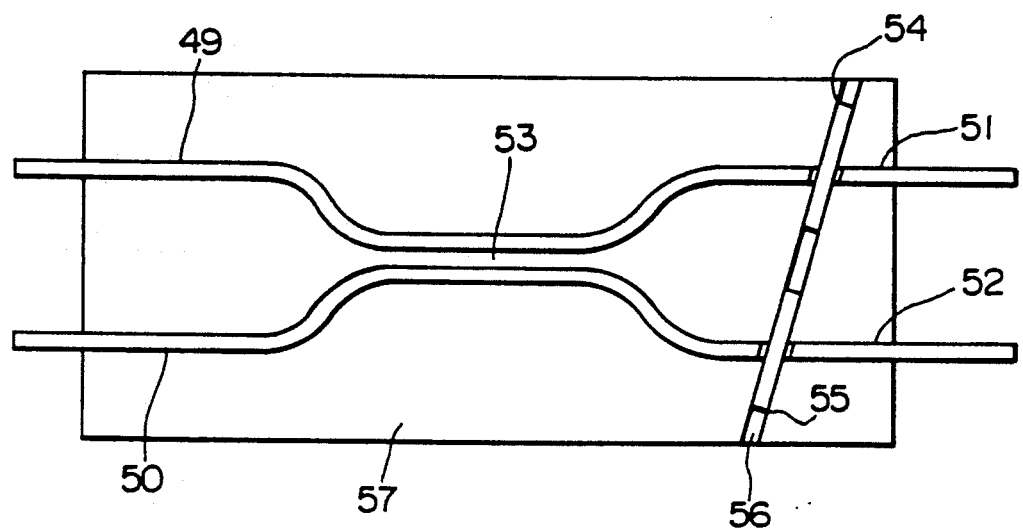
FIG. 17 is a plan view of a sixth embodiment of an optical element in accordance with the present invention.

FIG. 17 shows an optical element in accordance with a sixth preferred embodiment of the optical element of the present invention. The illustrated device is a type of multiple pathway optically coupling-splitting device, or as commonly referred to, an optical fiber coupler, in which two dielectric multilayer filters are incorporated. As described above, with this type of optical element, two or more optical fibers are brought into close approximation with one another in a parallel arrangement over a portion of their lengths to form an optical coupling region, whereby wavelength dependent optical coupling is achieved. The optical element shown in FIG. 17 includes two input optical fibers 49, 50, two output optical fibers 51, 52, an optical coupling region 53, two dielectric multilayer filter leaves 54, 55, each having a fluorinated polyimide base layer, a groove 56 wherein dielectric multilayer filter leaves 54 and 55 are mounted, and a base support 56 whereby input optical fibers 49 and 50, output optical fibers 51 and 52 and dielectric multilayer filter leaves 54 and 55 are supported. Through incorporation of the two dielectric multilayer filter leaves 54, 55 with fluorinated polyimide base layers, the optical element of FIG. 17 offers significant improvements in wavelength selectivity over conventional optical fiber couplers, based on the previously described features which are inherent to the dielectric multilayer filter of the present invention. This type of optical element has applications in which the optical fibers 51, 52 are the input optical fibers and optical fibers 49, 50 are the output optical fibers, that is to say, input optical signals traverse the dielectric multilayer filters 54, 55 prior to entering the coupling region 53. Thus, undesirable wavelength components can be effectively eliminated before splitting of other wavelength components takes place in the coupling region 53.

Figure 18:
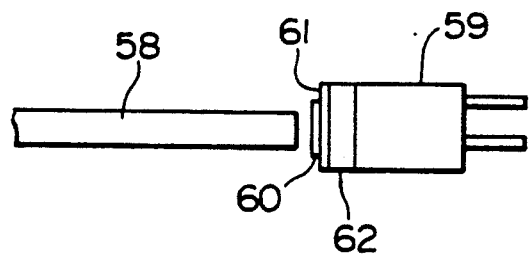
FIG. 18 is an side view of a seventh embodiment of an optical element in accordance with the present invention.

FIG. 18 shows an optical element in accordance with a seventh preferred embodiment of the optical element of the present invention. In this drawing, an input optical fiber 58 and optical receiver 59 can be seen, with a dielectric multilayer filter 60 with a fluorinated polyimide base layer intervening therebetween. The optical receiver 59 is provided with a glass window 61 and a semiconductor optical receiver cell 62. Because no mechanical coupling fittings are included, it is necessary to carefully align the optical axis of optical fiber 58 with that of optical receiver 59.

Figure 19A:
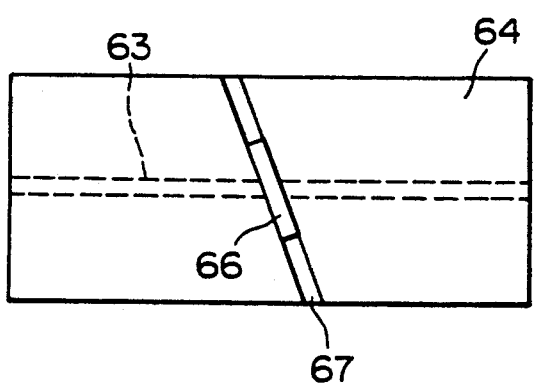
FIG. 19(a) is a plan view of an eighth embodiment of an optical element in accordance with the present invention.
Figure 19B:
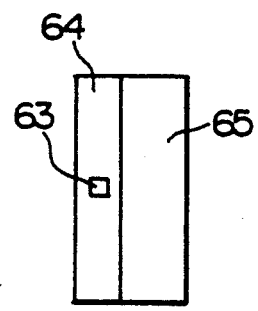
FIG. 19(b) is a side view of the optical element shown in FIG. 19(a).

FIG. 19 shows an optical element in accordance with a eighth preferred embodiment of the optical element of the present invention, in which a dielectric multilayer filter 66 with a fluorinated polyimide base layer is incorporated into a glass optical waveguide. The illustrated device includes an optical waveguide consisting of a core 63 and cladding 64, base plate 65 from which the optical waveguide is formed, and a groove 67 in which the above mentioned dielectric multilayer filter 66 is mounted. With this device, because the core 63 and cladding 64 of the waveguide are originally formed from base plate 65, the added steps of mounting a separate optical fiber on a base plate are eliminated. Also, similar to the second preferred embodiment, rather than a single waveguide, multiple optical waveguides can be provided in parallel leading up to the single dielectric multilayer filter 66. In this way, a pig tail type filter can be fabricated for joining optical fibers to an optical waveguide.

Figure 20:
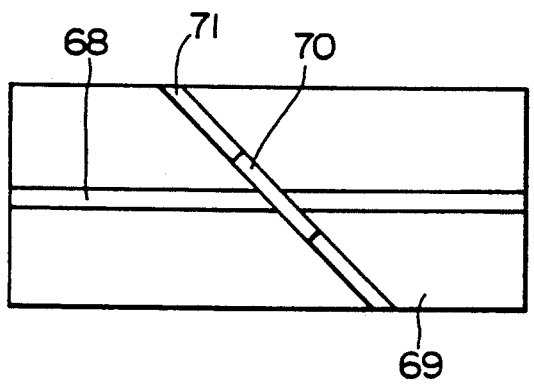
FIG. 20 is a plan view of a ninth embodiment of an optical element in accordance with the present invention.

FIG. 20 shows an optical element in accordance with a ninth preferred embodiment of the optical element of the present invention, which is applicable to devices acting as a polarizer. In the present embodiment, a dielectric multilayer filter 70 with a fluorinated polyimide base layer is included, mounted at an angle of approximately 45° with respect to the optical axis of an optical waveguide core 68. The dielectric multilayer filter 70 is mounted in a groove 71 in a supporting base (not shown). The principal axis of the optical waveguide is inherently mounted on the supporting base such that either polarization parallel to the supporting base (TE polarization) or polarization perpendicular to the supporting base (TM polarizaiton) can be supported. Accordingly, in contrast to the optical element of the third embodiment, with the optical element of the present embodiment, the necessity for rotationally aligning axes of polarization is eliminated.

Figure 21:
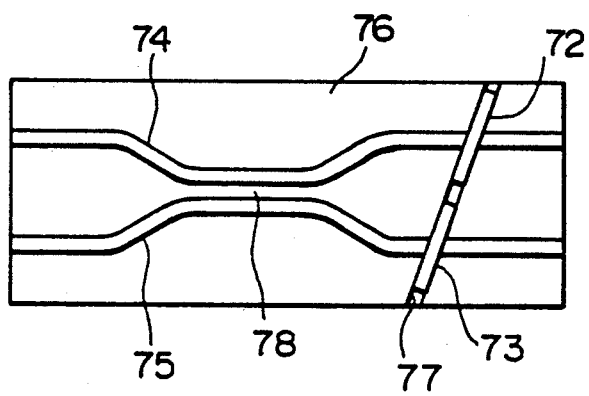
FIG. 21 is a plan view of a tenth embodiment of an optical element in accordance with the present invention.

FIG. 21 shows an optical element in accordance with a tenth preferred embodiment of the optical element of the present invention. The illustrated device is a type of optical coupler device in which two dielectric multilayer filters 72, 73 with fluorinated polyimide base layers are incorporated into either the input pathway or output pathway thereof. The optical element shown in FIG. 21 includes the above mentioned two dielectric multilayer filters 72, 73 with fluorinated polyimide base layers, two cores 74, 75 and cladding 76 of the optical waveguide, a groove 77 wherein dielectric multilayer filter leaves 54 and 55 are mounted, and an optical coupling region 78. The function of this device is essentially identical to that of the sixth preferred embodiment.

Figure 22:
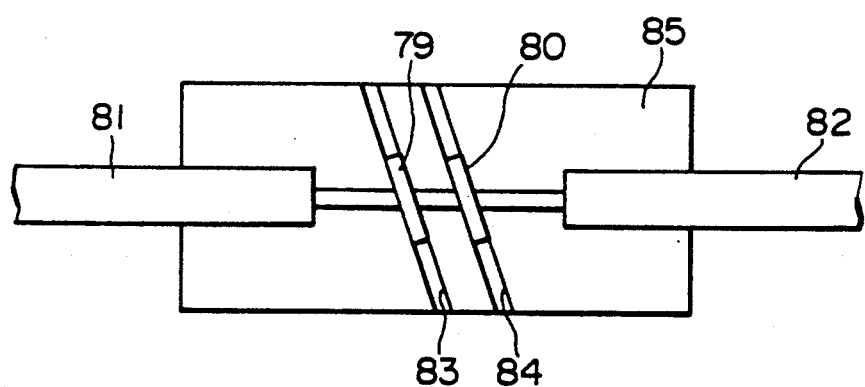
FIG. 22 is a plan view of a eleventh embodiment of an optical element in accordance with the present invention.
Figure 23A:
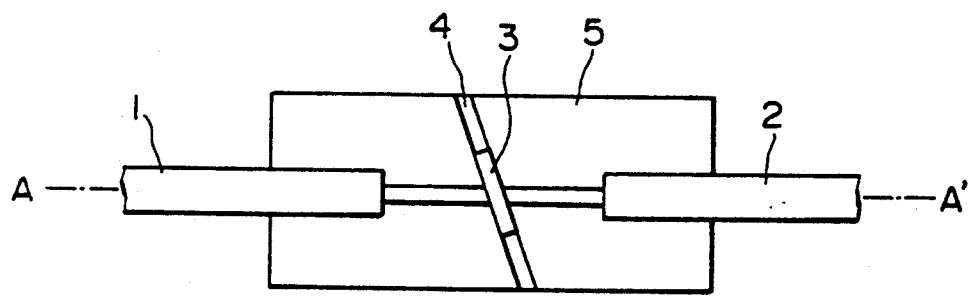
FIG. 23 is a plan view of a conventional optical element employing a dielectric multilayer filter.
FIG. 23(b) is a vertical cross-sectional view of the optical element shown in FIG. 23(a) through the line A—A'.
Figure 23B:
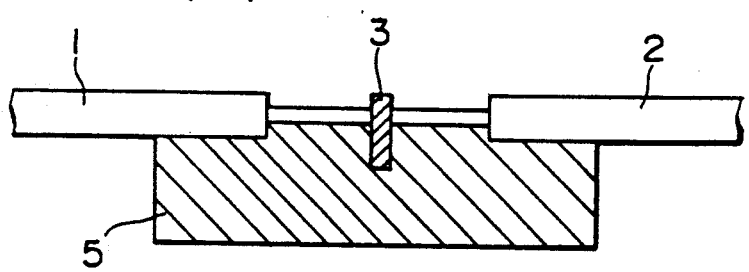
Figure 24:
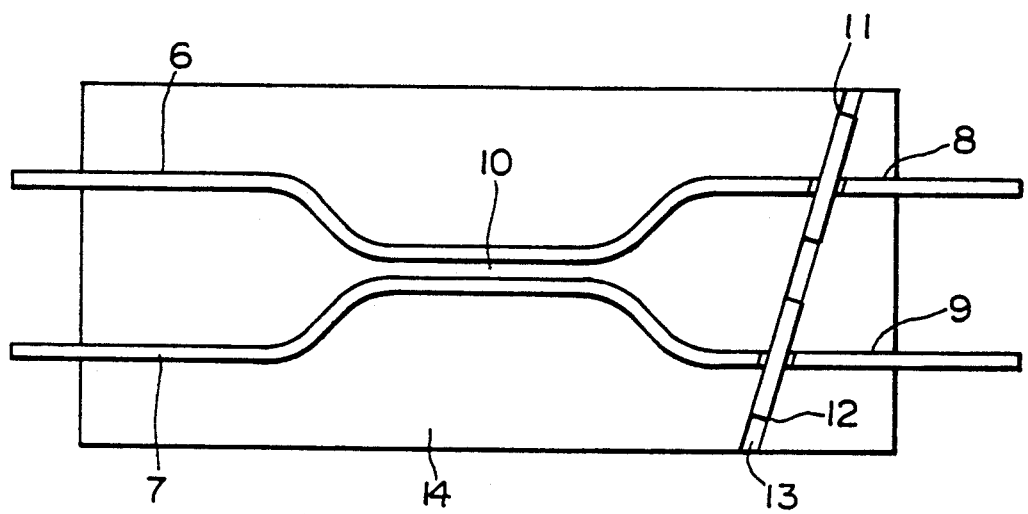
FIG. 24 is a plan view of another conventional optical element employing a dielectric multilayer filter.
Figure 25:
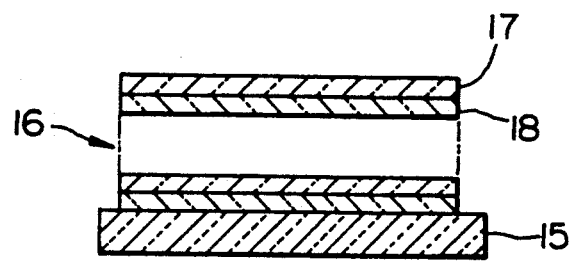
FIG. 25 is a cross-sectional view of a conventional dielectric multilayer filter.
Figure 26:
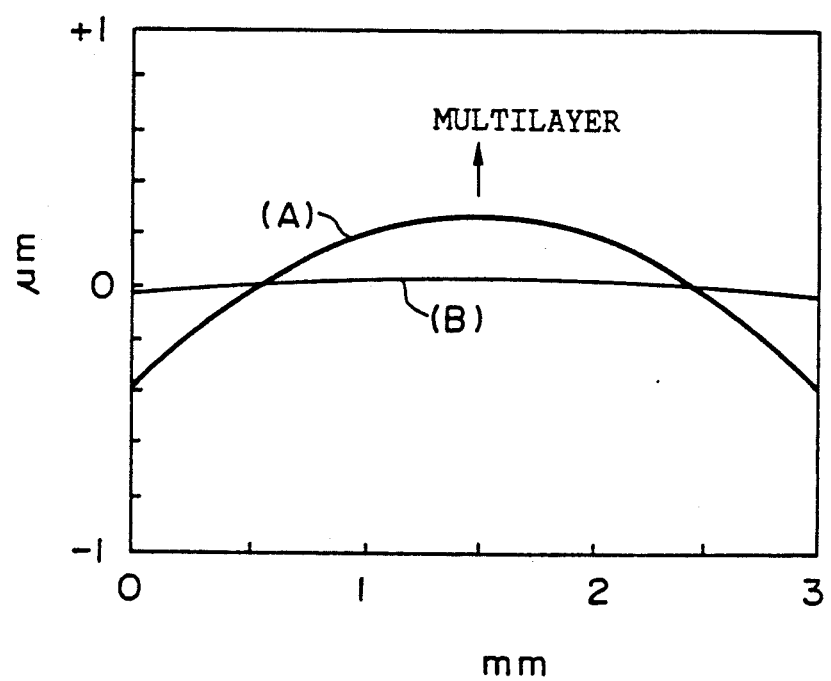
FIG. 26 is a graph showing warping characteristics of two conventional dielectric multilayer filters.
Figure 27A:
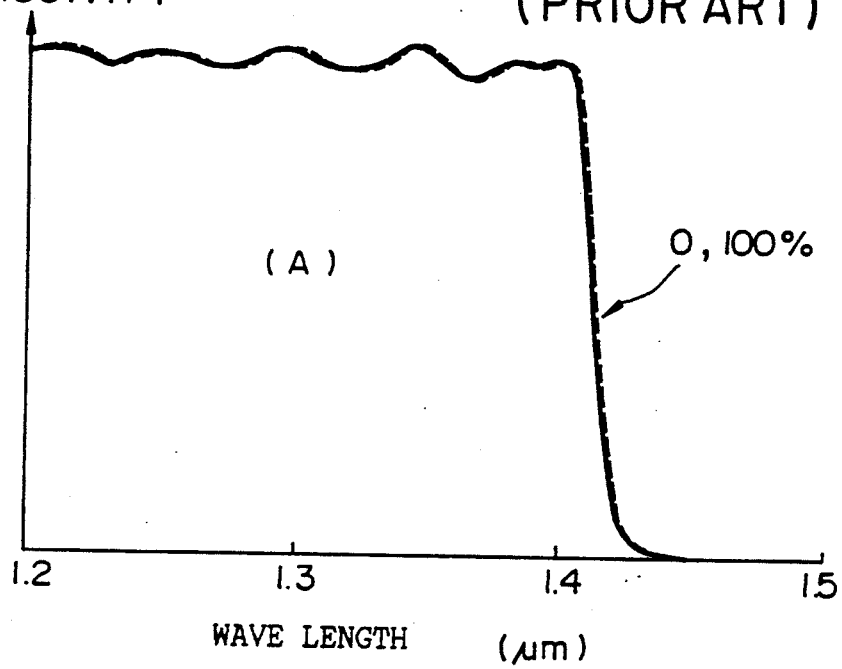
FIG. 27(a) and 27(b) are graphs showing spectral characteristics of the two conventional dielectric multilayer filters for which graphs of warping characteristics are shown in FIG. 26.
Figure 27B:
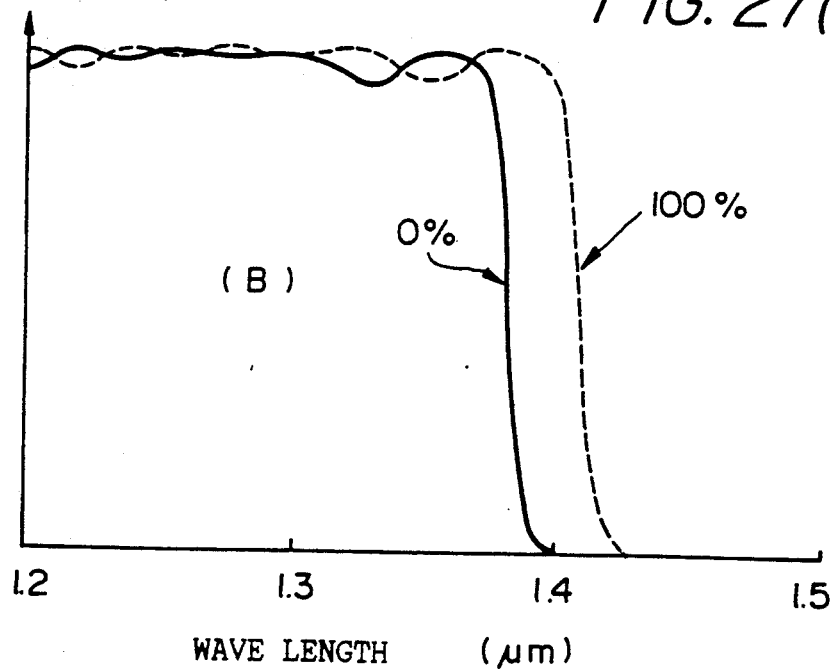

FIG. 22 shows an optical element in accordance with an eleventh preferred embodiment of the optical element of the present invention which incorporates multiple dielectric multilayer filters with fluorinated polyimide base layers. The optical element shown in FIG. 22 includes two dielectric multilayer filters 79, 80 with fluorinated polyimide base layers, two optical fibers 81, 82, two grooves 83, 84 for dielectric multilayer filters 79, 80, respectively, and a supporting base 85. This device makes it possible to eliminate two or more undesirable wavelength components from an input optical signal, and is especially useful when the wavelengths of the components to be removed cannot be practically filtered out with a single filter. As in this embodiment, multiple dielectric multilayer filters with fluorinated polyimide base layers can be inserted into a single optical pathway in any of the preceding ten embodiments.

Various other implementations not described herein are possible which do not deviate from the essential spirit and principle concepts of the present invention. Thus, the embodiments described in the present document should not be considered to represent limitations, but rather, representative examples for the purpose of explaining the features and concepts inherent to the present invention. Accordingly, it should be understood that any implementation which is encompassed within the bounds of the appended claims, or a variation thereon, represents an aspect of the present invention.

What is claimed is:

1. A dielectric multilayer filter including a multilayer consisting of multiple layers of differing indices of refraction applied over a base layer by means of an ion assist vapor deposition method, wherein said base layer includes at least one fluorinated polyimide compound, wherein fluorine atoms constitute 10 to 30 weight % of said fluorinated polyimide compound and said fluorinated polyimide compound has a coefficient of thermal expansion less than that of said multilayer.

2. An optical element comprising:
   at least one optical pathway,
   at least one dielectric multilayer filter within an interstice in said at least one optical pathway, said dielectric multilayer filter including a multilayer consisting of multiple layers of differing indices of refraction on a base layer consisting of a fluorinated polyimide compound, wherein fluorine atoms constitute, 10 to 30 weight % of said fluorinated polyimide compound and said fluorinated polyimide compound has a coefficient of thermal expansion less than that of said multilayer.

* * * * *